(12) United States Patent
Kah, Jr.

(10) Patent No.: US 7,792,612 B2
(45) Date of Patent: *Sep. 7, 2010

(54) EXPANDABLE IRRIGATION CONTROLLER

(76) Inventor: Carl L. C. Kah, Jr., 11517 Turtle Beach Rd., North Palm Beach, FL (US) 33408

( * ) Notice: Subject to any disclaimer, the term of this patent is extended or adjusted under 35 U.S.C. 154(b) by 0 days.

This patent is subject to a terminal disclaimer.

(21) Appl. No.: 12/511,871

(22) Filed: Jul. 29, 2009

(65) Prior Publication Data

US 2009/0292401 A1 Nov. 26, 2009

Related U.S. Application Data

(63) Continuation of application No. 11/714,463, filed on Mar. 5, 2007, now Pat. No. 7,574,285.

(60) Provisional application No. 60/794,266, filed on Apr. 21, 2006, provisional application No. 60/781,630, filed on Mar. 13, 2006, provisional application No. 60/778,872, filed on Mar. 3, 2006.

(51) Int. Cl.
G06D 7/06 (2006.01)
A01G 25/16 (2006.01)
F17D 3/00 (2006.01)

(52) U.S. Cl. .................. 700/284; 239/69; 137/624.11

(58) Field of Classification Search .................. 700/16, 700/17, 284; 137/624.2, 624.11, 624.16; 361/614, 624, 627, 632, 633, 636, 639, 640, 361/655; 239/69

See application file for complete search history.

(56) References Cited

U.S. PATENT DOCUMENTS 4,244,022 A 1/1981 Kendall (Continued)

OTHER PUBLICATIONS

Fisher, George W. Grounds maintenance. Overland Park: Jun. 2005. vol. 40, Iss. 6; p. 8 (6 pages) [downloaded Oct. 27, 2008] retrieved from ProQuest www.proquest.com.

(Continued)

*Primary Examiner*—Albert DeCady
*Assistant Examiner*—Dave Robertson
(74) *Attorney, Agent, or Firm*—Ostrolenk Faber LLP

(57) ABSTRACT

An expandable irrigation controller for controlling a plurality of watering stations in an irrigation system includes a removable front panel and an inner housing, connected to the front panel. The removable front panel includes a plurality of manual controls operable to input instructions for a watering program, a memory operable to store the input instructions and a controller operable to execute the watering program. The inner housing includes a circuit board including control connectors which are connected electrically to the controller and a station module operable to provide an ON/OFF signal to at least one watering station of the irrigation system. The station module is electrically connected to the circuit board via the control connectors and the ON/OFF signal is provided based on instructions from the controller in accordance with the watering program. The control connectors are positioned in a substantially continuous line extending across the inner housing such that the station module is connectable to the control connectors at substantially any desired location. Multiple modules of different sizes may be mounted in the inner housing as desired. Control information may be provided via a radio frequency supply and received by a radio frequency module to be provided to the station modules and to external station modules in an external housing.

8 Claims, 15 Drawing Sheets

U.S. PATENT DOCUMENTS

| | | | |
|---|---|---|---|
| 6,459,959 | B1 | 10/2002 | Williams |
| 6,671,763 | B1 | 12/2003 | Korowitz et al. |
| 6,721,630 | B1 | 4/2004 | Woytowitz |
| 6,772,050 | B2 | 8/2004 | Williams et al. |
| 6,996,457 | B2 | 2/2006 | Williams et al. |
| D517,020 | S | 3/2006 | Cook et al. |
| 7,050,887 | B2 | 5/2006 | Alvarez |
| 7,069,115 | B1 | 6/2006 | Woytowitz |
| 7,206,669 | B2 | 4/2007 | Christiansen |
| 7,243,005 | B1 | 7/2007 | Beutler et al. |
| 7,257,465 | B2 | 8/2007 | Perez et al. |
| 7,289,886 | B1 | 10/2007 | Woytowitz |
| 7,400,944 | B2 | 7/2008 | Bailey et al. |
| 2005/0055106 | A1 | 3/2005 | Beutler et al. |
| 2007/0179674 | A1 | 8/2007 | Ensworth et al. |
| 2008/0027587 | A1 | 1/2008 | Nickerson et al. |
| 2008/0058964 | A1 | 3/2008 | Nickerson et al. |

OTHER PUBLICATIONS

Drury, Sally. Horticulture Week. Teddington: Jun. 3, 2004. p. 33 (2 pages) [downloaded Oct. 27, 2008] Retrieved from ProQuest www.proquest.com.

Hunter Industries, "Modular controllers mean you'll always have "The Right Controller for Every Job"", Hunter Industries Inc., San Marcos, CA [obtained Oct. 27, 2008 from U.S. Appl. No. 11/022,329].

Hunter Industries, "Pro-C Controller, A complete family of full-featured residential and light commericial controllers", Mar. 2002, pp. 1-32, Hunter Industries Inc., San Marcos, CA [obtained Oct. 27, 2008 from U.S. Appl. No. 11/022,329].

Hunter Industries, "ICC Controllers, Institutional Series Controllers for Heavy Duty Residential and Commercial Applications," Nov. 2002, pp. 1-22, Hunter Industries Inc., San Marcos, CA [obtained Oct. 27, 2008 from U.S. Appl. No. 11/022,329].

Rain Bird, "Rain Bird-Landscape Irrigation: Products: IM Series Controllers", www.rainbird.com published at http://web.archive.org/web/20030203155244/www.rainbird.com/landscape/products/controllers/im.htm, Feb. 5, 2003, pp. 1-4, Rain Bird Corporation, Glendora, CA, [obtained Oct. 27, 2008 from U.S. Appl. No. 11/022,329].

EXPANDABLE IRRIGATION CONTROLLER

CROSS REFERENCE TO RELATED APPLICATIONS

The present application is a continuation of U.S. patent application Ser. No. 11/714,463 entitled EXPANDABLE IRRIGATION CONTROLLER filed Mar. 5, 2007 which claims benefit of and priority to U.S. Provisional Patent Application No. 60/778,872 entitled EXPANDABLE IRRIGATION CONTROLLER filed Mar. 3, 2006, U.S. Provisional Patent Application No. 60/781,630 entitled EXPANDABLE IRRIGATION CONTROLLER filed Mar. 13, 2006 and U.S. Provisional Patent Application No. 60/794,266 entitled EXPANDABLE IRRIGATION CONTROLLER, filed Apr. 21, 2006, the entire contents of each of which is hereby incorporated by reference herein.

BACKGROUND OF THE INVENTION

1. Field of the Invention

This invention relates to an expandable irrigation controller for controlling operation of an irrigation system pursuant to a watering schedule that may be programmed by a user. More particularly, this invention relates to an expandable irrigation controller for controlling multiple irrigation stations.

2. Description of the Related Art

Over the past decade modular expandable irrigation controllers have gained increasing popularity although they have been in commercial use dating back into the 1970's or earlier; i.e. such as the Toro Golf Course Satellite Irrigation Controller. The base portion of these controllers typically contains the programmable logic portion, or microprocessor and user actuated controls.

Each watering station is then preferably controlled by a corresponding module that includes electronically controllable station on/off switching circuitry. The modules are preferably connected to a plurality of irrigation control valves in the irrigation system at each of a plurality of watering stations. These valves are typically solenoid activated. Generally, each module can independently control more than one watering station.

The modules shown in the prior art Toro Golf Course Satellite Irrigation Controller each controlled 8 stations with four 8-station modules installed and another 4 positions for a total of 8 station modules in the same weather resistant enclosure. Some other expandable controllers show various arrangements of "slots" or "cavities" for accommodating modules of a selected size.

The modules typically contain pins, sockets, card edge connectors, or some other standard form of electro-mechanical connectors that allow them to be inserted into the slots or receptacles in either the housing that contains the microprocessor or a separate portion connected to the microprocessor housing. The advantage of this configuration is that the controller can be provided with a minimum number of modules suitable for control of the total number of watering stations in the system at first, yet can economically and easily be expanded if the need for more watering stations later occurs. Thus, for example, an irrigation system may have only three zones, requiring only a single station module, while another may have twelve stations, which might require four 3-station modules. Considerable cost savings are thus achieved. Moreover, if an irrigation system expands after initial installation because the landscaping has increased, additional station modules can be added without having to replace the entire controller.

Since station output switching circuits may be damaged in service by lightning or over-load current, over time, the damaged circuitry can be replaced by simply replacing a module without the effort or expense of replacing or removing for service the entire irrigation controller.

In the prior art, however, there are slots, cavities or mounting pads for selected size modules to go into selected locations. Modules of the same size are often interchangeable in that the "slots", "cavities" or "pads" are of the same size. However, this means that the modules must be installed into slot cavities or onto pads that are large enough to accommodate the number of watering stations that they will power. Smaller modules would not fit into the slots, cavities etc., or would be loose and not mounted properly, which may affect proper contact. Thus, there is limited flexibility as to the size of the modules, and consequently, the number of watering stations they may control.

The new Toro TMC-424 controller does not provide for wider modules in order to accommodate additional terminals for station control, but adds more rows of terminals on same width station expansion module so that they can fit into same slots or cavities. Thus, size of the modules is still limited.

In some cases, only 2 station module slots or cavities are shown. Thus, to get 8 station outputs or terminals, the customer must purchase 4 two station modules. This may be more expensive than purchasing 2 four-station modules or 1 eight-station module. When additional expansion is required, one must add modules of a size allowed for by the pre-existing slots or cavities of the controller housing.

The new Toro Controller TMC-424 uses station expansion modules that fit into existing sized cavities or slots, but adds more terminals to each module in double rows. However, as noted above, this limits flexibility with regard to the size of the modules that may be used to expand the number of watering stations controlled by the controller, which may result in higher costs.

SUMMARY OF THE INVENTION

In accordance with an embodiment of the present invention, a modular expandable irrigation controller is provided including controls for manual entry or selection of a watering program and a memory for storing the watering program. A processor executes the stored watering program and controls one or more station modules, each including a station module circuit for energizing at least one solenoid actuated valve in accordance with the watering program.

The basic controller may have only a continuous single plug-in area where station expansion circuit modules of any of several different sizes may be installed into the controller in any order as required, not just into pre-manufactured module size cavities or slots requiring buying more, smaller modules to get to more stations.

An expandable irrigation controller for controlling a plurality of watering stations in an irrigation system in accordance with an embodiment of the present invention includes a removable front panel, the removable front panel including a plurality of manual controls operable to input instructions for a watering program, a memory operable to store the input instructions and a controller operable to execute the watering program. The controller also includes an inner housing connected to the front panel, the inner housing including a circuit board including control connectors which are connected electrically to the controller and a station module operable to provide an ON/OFF signal to at least one watering station of the irrigation system, wherein the station module is electrically connected to the circuit board via the control connectors and the ON/OFF signal is provided based on instructions from the controller in accordance with the watering program. The control connectors are preferably positioned in a substantially continuous line extending across the inner housing such that the station module is connectable to the control connectors at substantially any desired location In accordance with another embodiment of the present invention, the controller may send out an inquiry signal to the station module prior to enacting control to confirm the presence of the station module based on whether the station module draws current in response to the inquiry signal.

An expandable irrigation controller for controlling a plurality of watering stations in an irrigation system in accordance with an embodiment of the present invention includes a removable front panel, the removable front panel including a plurality of manual controls operable to input instructions for a watering program, a memory operable to store the input instructions and a controller operable to execute the watering program. The expandable irrigation controller also includes an inner housing connected to the front panel. The inner housing includes a circuit board connected electrically to the controller, wherein the circuit board includes two electrical conductors extending across the inner housing, wherein control information from the controller is encoded for transmission on the two electrical conductors and a station module operable to provide an ON/OFF signal to at least one watering station of the irrigation system. The station module is preferably electrically connected to the two electrical conductors and the ON/OFF signal is provided based on the control information from the controller in accordance with the watering program. The station module is preferably connectable to the two electrical conductors at substantially any desired location.

DETAILED DESCRIPTION OF THE INVENTION

Figure 1:
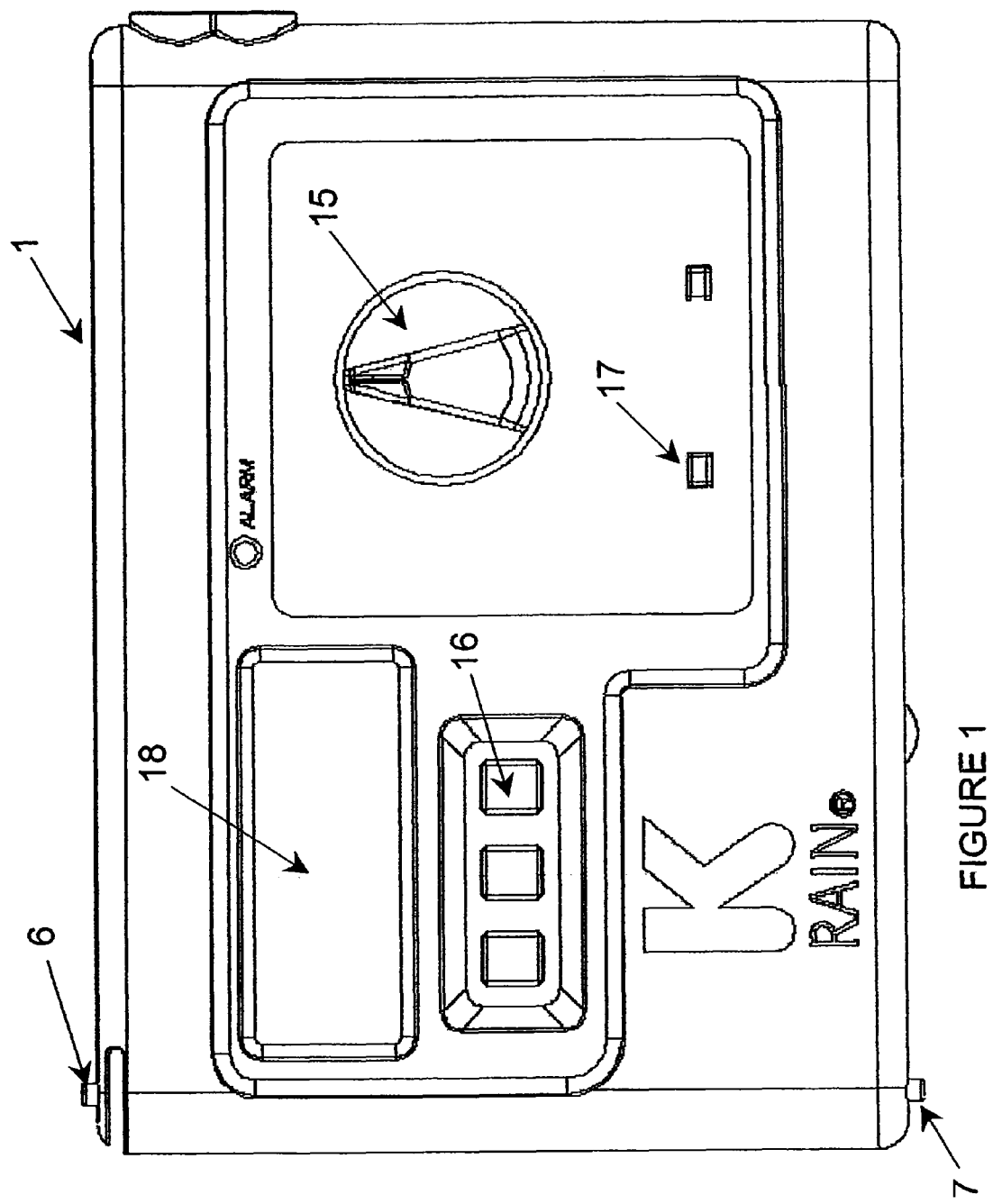
FIG. 1 is an illustration of a front panel of an expandable irrigation controller in accordance with an embodiment of the present invention.

FIG. 1 illustrates a removable front panel 1 of a modular irrigation controller 10 in accordance with an embodiment of the present invention. The front panel 1 is preferably removably hinged to the inner housing 2, (see FIG. 2), by hinge pins 6 and 7 which fit into pin holes 8 and 9 formed on the inner housing 2. A set of manual actuation controls including, for example, a rotary switch 15, one or more push buttons 16 and one or more slide switches 17 may be provided on the panel 1 to allow for inputting instructions or commands to a microprocessor (not shown) that is enclosed in the panel 1. These instructions may be part of a watering program executed by the microprocessor and preferably stored in a memory also provided in the panel 1. An LCD display 18 may also be provided to display activities being transacted by the expandable irrigation controller's microprocessor. The panel 1 is preferable removably attached to the inner housing 2 (see FIG. 2) such that it can be removed, for example, while a watering program is being entered. Thus, the panel 1 may also include a battery.

Figure 2:
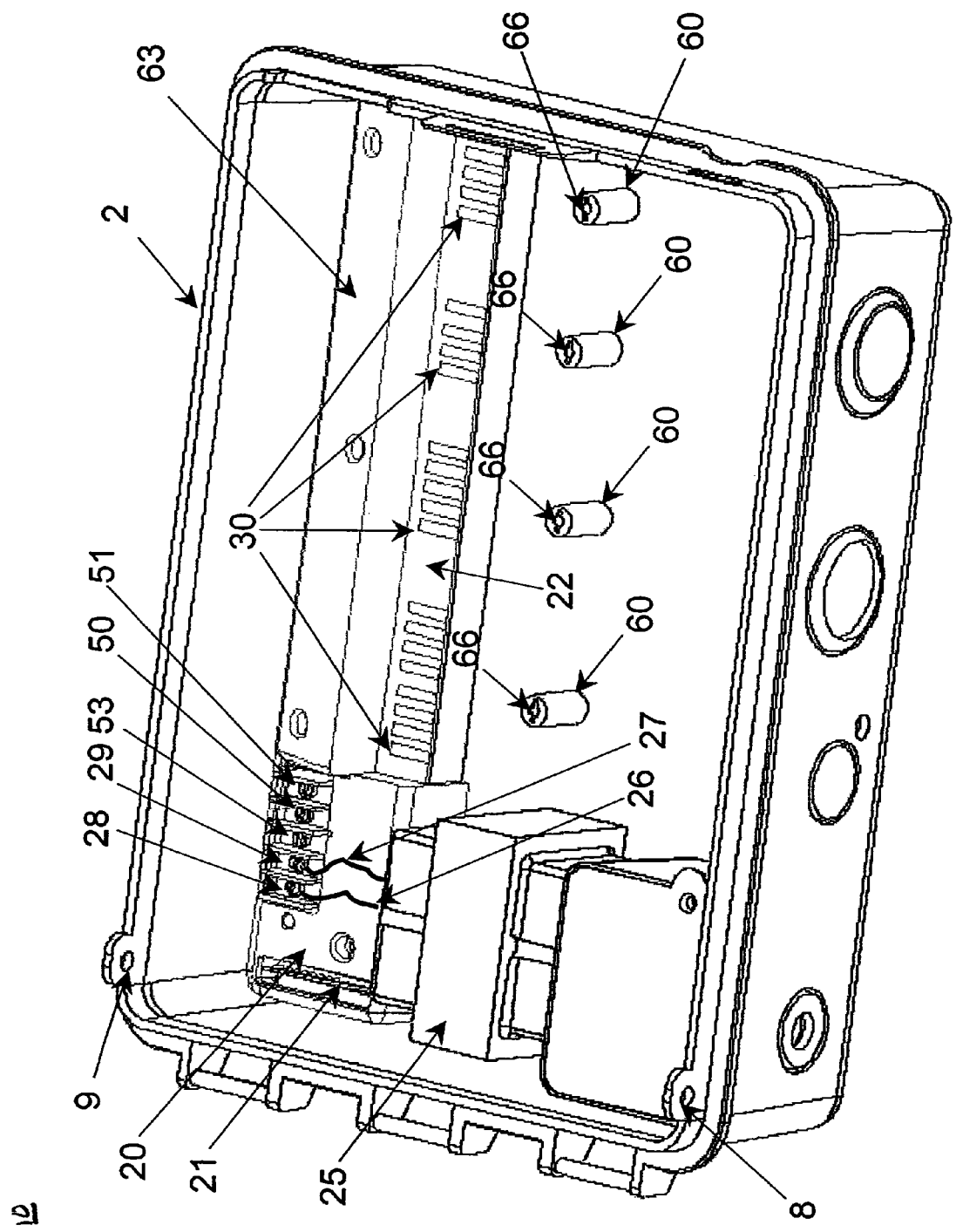
FIG. 2 is an illustration of an inner housing of an expandable irrigation controller in accordance with an embodiment of the present invention.

The main controller or microprocessor is preferably mounted inside the front panel 1, as noted above, and is preferably connected via a ribbon cable or other connector to the connector socket 21 of the back panel cover 20 of the inner housing 2 (see FIG. 2, for example). The back panel cover 20 may include the contacts 30 for connection to the station modules used to control the water stations. Three different sized station modules 31, 32 and 33, are shown installed into the housing 2 in FIG. 3.

The removable front panel 1 of the expandable irrigation controller 10 which contains the manual controls 14, 15, 16 and the microprocessor (not shown) is connected to the circuit board 22 covered by the panel cover 20, its power supply 25 and the contacts 30 for the station modules via the ribbon cable. The power supply 25 is preferably a transformer connected to the circuit board 22 by transformer wires 26 and 27 and terminal screws 28 and 29. Terminal screws 50 and 51 in the cover 20 may be used for connection to a rain switch, if desired, and the terminal 53 may be used for connection to ground.

Figure 3:
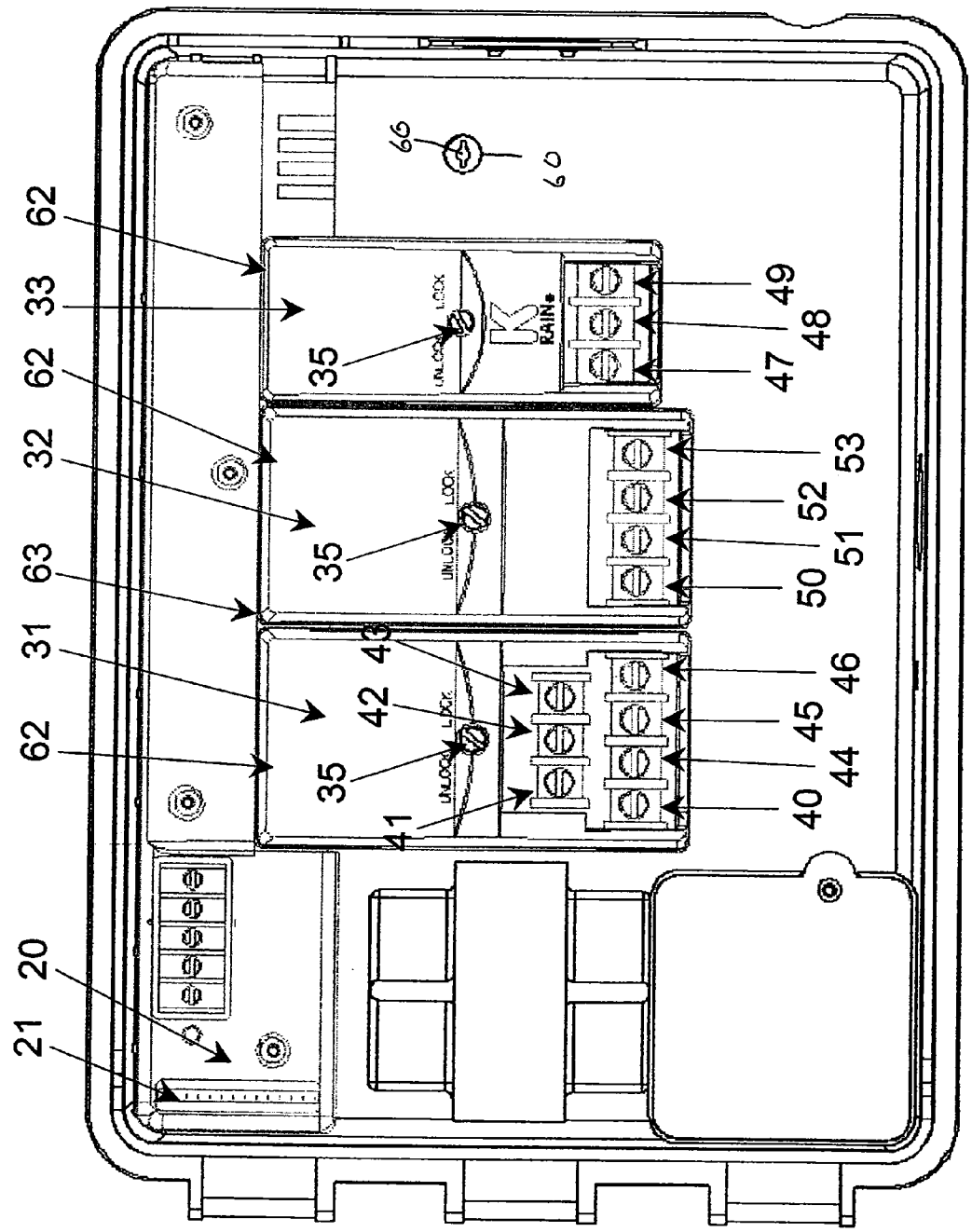
FIG. 3 is an illustration of output station modules installed in the inner housing of the expandable controller of FIG. 2.
Figure 4:
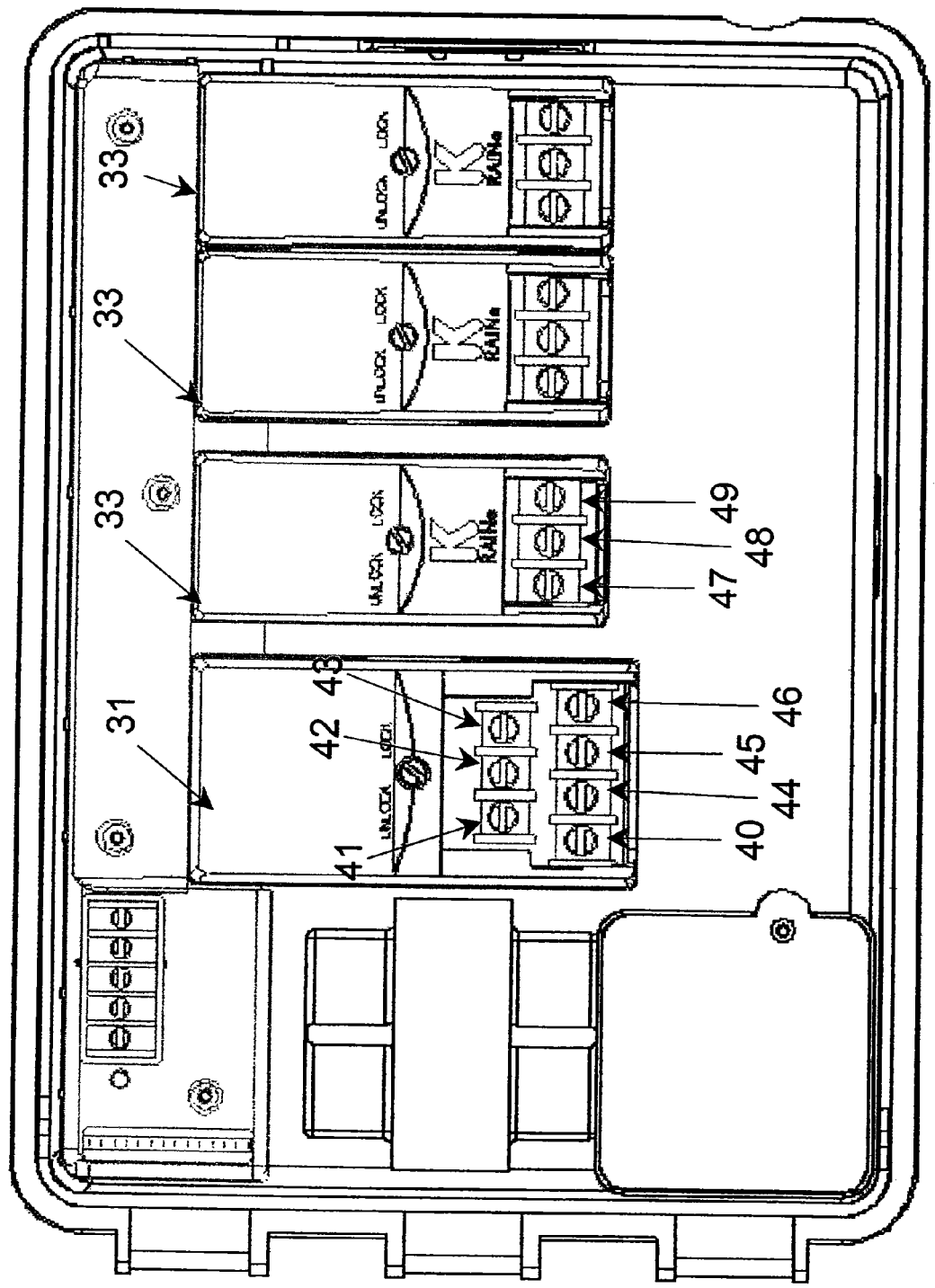
FIG. 4 illustrates a different arrangement of station modules installed in the inner housing of the expandable irrigation controller of FIGS. 2 and/or 3.

FIG. 4 illustrates the inner housing 2 of the expandable irrigation controller 100 of FIGS. 2-3 with a different configuration of station modules including modules 31, 33 mounted therein. As can be seen in FIG. 4, one station module similar to module 31 of FIG. 3 is mounted in the housing 2 along with three station modules similar to module 33 of FIG. 3. As can be seen in FIG. 4, the station modules 33 may be positioned immediately next to each other, or may be separate from each other and the module 31. Thus, the versatility of the controller 10 of the present invention is clear. As is also clear, different sized modules 31, 33 can be mounted in the inner housing 2.

Station module 31 is shown with seven terminal contact screws 40-47 which may be used for connection to six watering stations. The extra terminal is preferably used as a common return terminal for all of the other watering stations controlled by the controller. A module of the size of module 31 could also be pre-constructed to provide an output to control a pump start relay or master valve as well, while the other five terminals may be connected to individual watering stations via field wires (not shown). The station module 32 of FIG. 3 preferably controls four watering stations using the four terminals 50-53 (see FIG. 3). Station module 33 preferably controls 3 station modules via the terminals 47-49.

Figure 7:
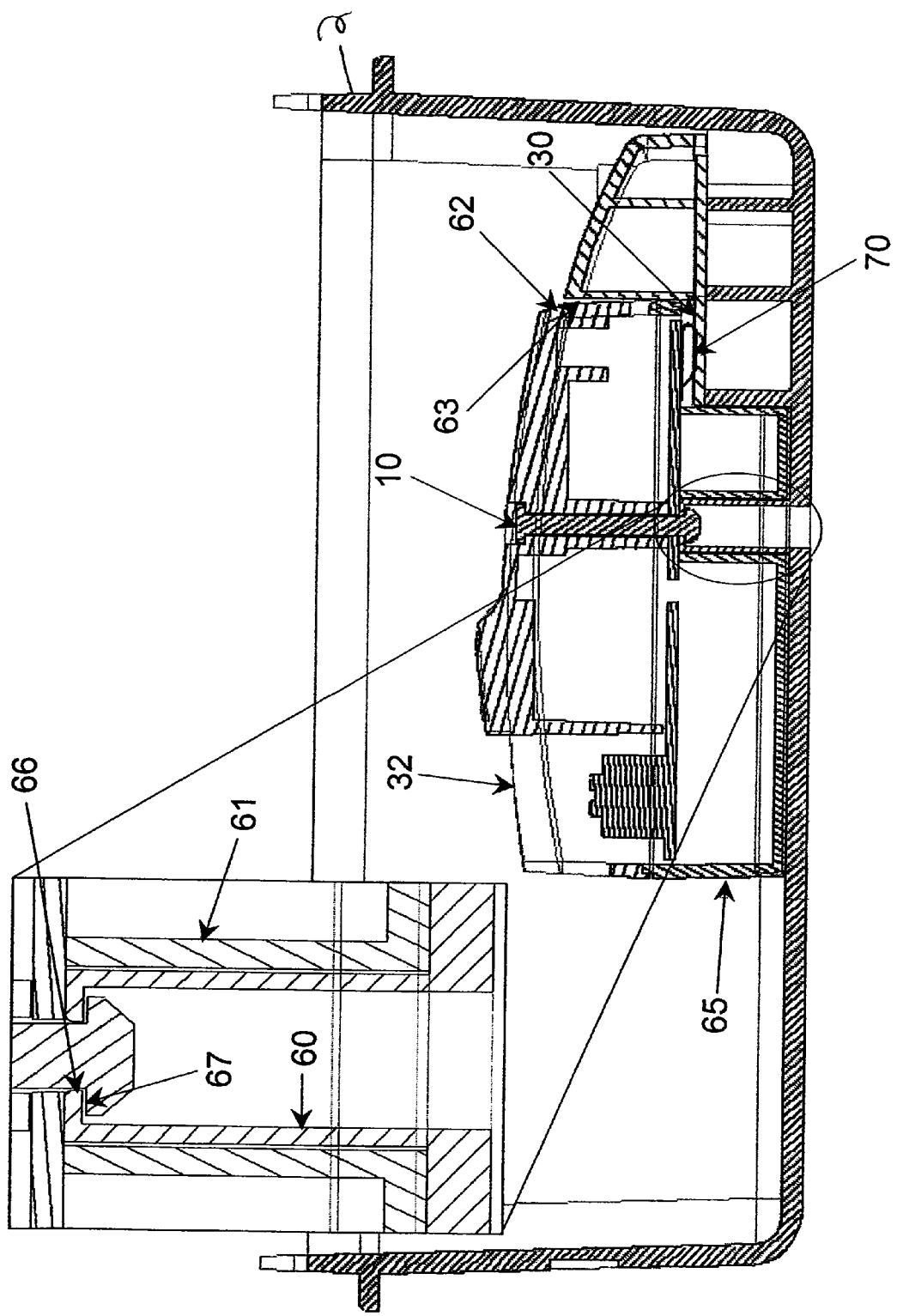
FIG. 7 is a partial cross section view of a module mounted in the inner housing of FIGS. 2 and/or 3.

The housing 2 of FIG. 2 shows the mounting and alignment pins 60 extending up from the back wall of the housing 2. The station modules, such as station modules 31, 32, 33, may be installed on the mounting pins 60 by aligning a hole 66 in the bottom cover 65 (see FIG. 7, for example) of each station module (31, 32, 33) with the pin 60 and turning the top end of the module surface 62 to align with the end surface 63 of the cover 20, as shown in FIGS. 2, 3 and 7. The module (31, 32, 33) may then be pushed down such that the spring contacts 70 contact the contacts 30 of the circuit board 22. See FIG. 7, for example. FIG. 7 illustrates module 32 mounted on a pin 60, however, the other modules 31 and 33 are mounted in a similar manner.

Figure 5:
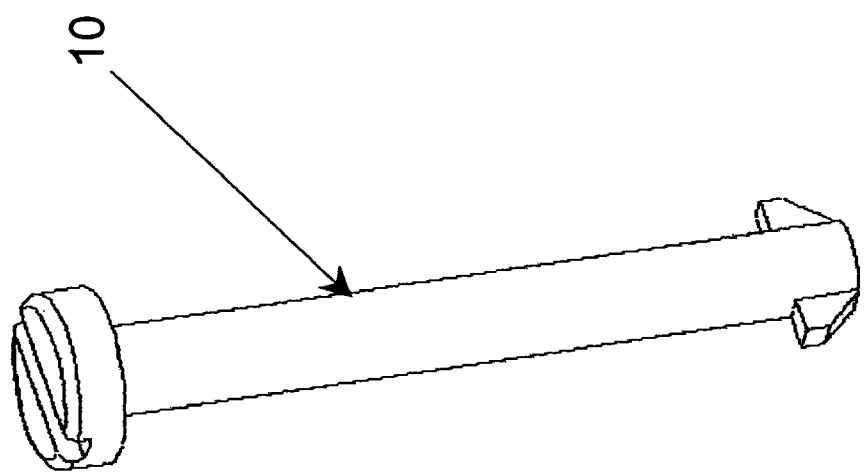
FIG. 5 is an illustration of a twist type lock screw.
Figure 6:
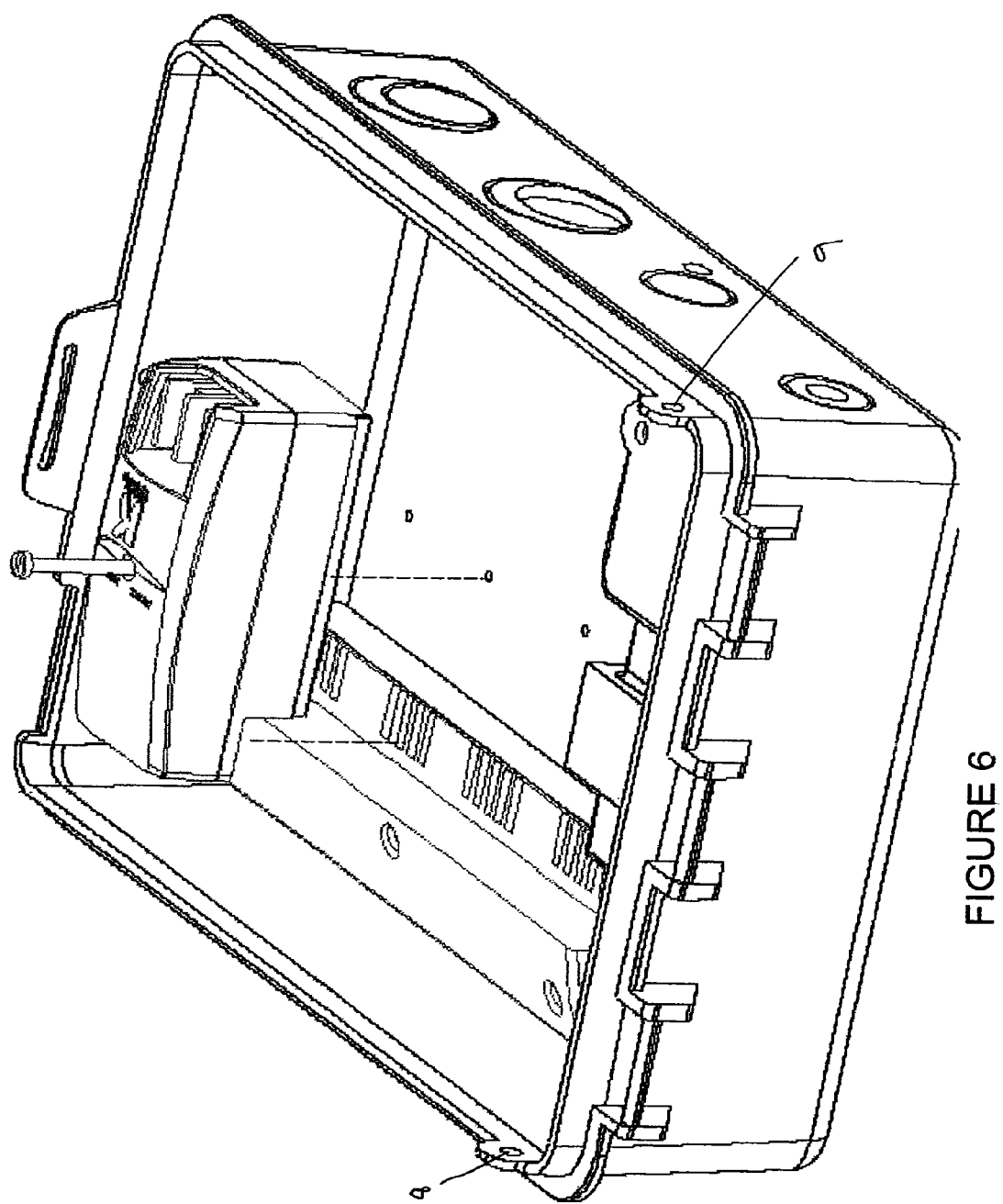
FIG. 6 is an illustration of an inner housing of an expandable irrigation controller in accordance with another embodiment of the present invention.

The station module (31, 32, 33) may then be locked in place by twist lock screw 10 (see FIG. 5, for example) such that spring contact 70 is compressed. In a preferred embodiment, the station module is permanently locked into place via the screw 10 such that the module cannot be easily removed. That is, a locking means of some sort is preferably provided to lock the screw 11 down once it is used to secure the station module (31, 32, 33) into place. As a result, the station modules are generally not removable from the housing 2 once they are installed. Alternatively, the modules may be releasably secured by the screw as well The twist lock screw 10 engages the underside 67 of the hollow alignment pins 60 through a keyhole opening 66 in the top of the pin 60. See FIGS. 2 and 7, for example. The locking means (not shown) may thus be provided on the hollow side of the pin 60 for example.

Figure 8:
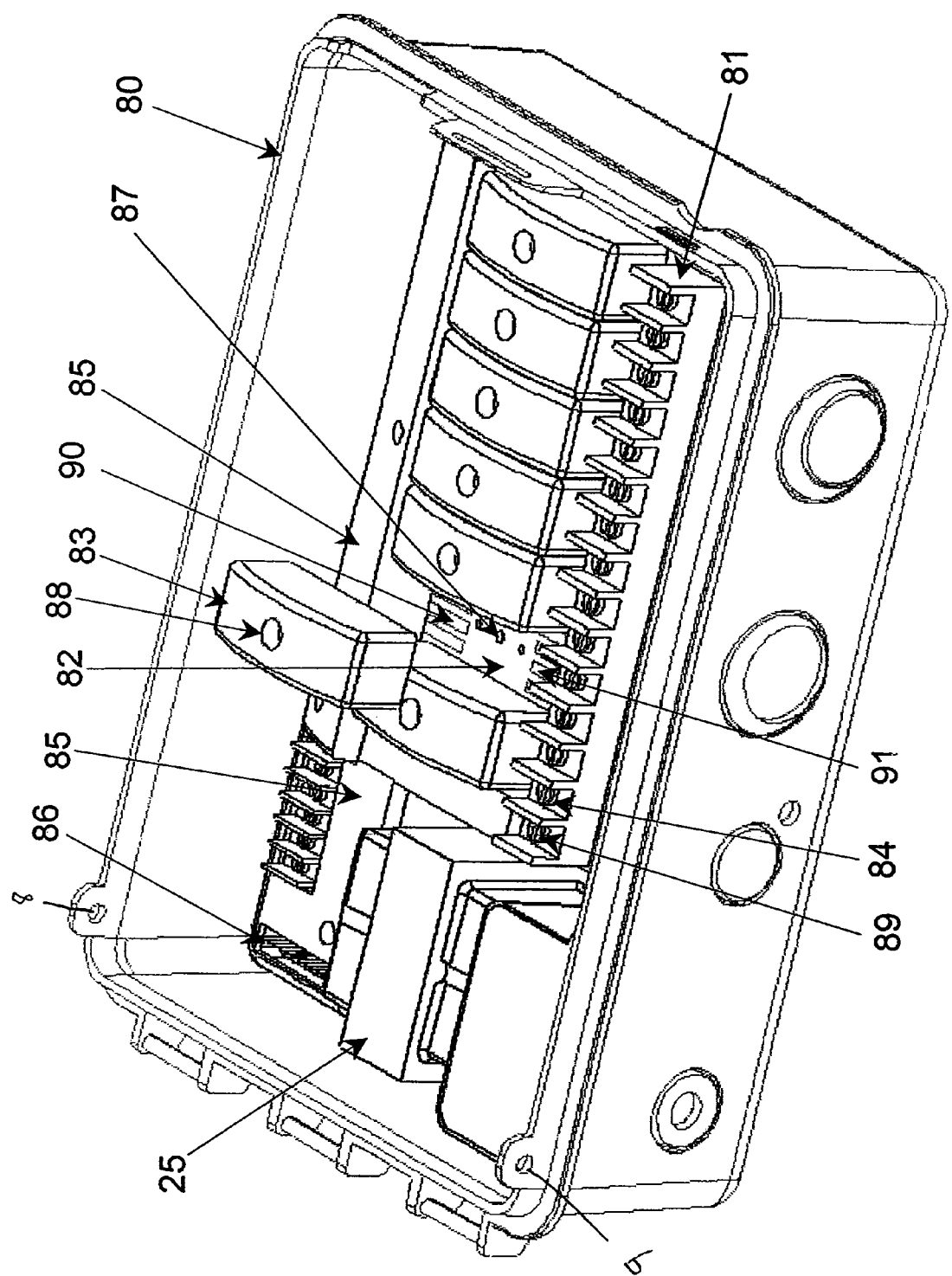
FIG. 8 is an illustration of an inner housing of an expandable irrigation controller in accordance with another embodiment of the present invention.

FIG. 8 illustrates an inner housing 80 of an expandable irrigation controller in accordance with an alternative embodiment of the present invention. The housing 80 is preferably connected to the panel 1 of FIG. 1 in much the same manner as described above. As illustrated, an output terminal strip 81 is permanently mounted on the housing's circuit board 82. That is, the output terminals 84 that are connected to the watering stations are permanently mounted in the housing 80, rather than being mounted on a station module. There are at least two advantages provided by this configuration: (1) the field wiring to the output terminals of the expandable irrigation controller, once connected, does not have to be removed to replace a module, and (2) the control circuitry can be separated from the power circuitry. The station modules 83 include the relatively expensive power switch that provides the ON/OFF signal provided to the watering stations controlled by the station module and whatever other power supply and drive circuitry is required. The station modules 83 may include only a relay with its switch contacts for providing power on and off to the terminals, such as terminal 84, along the terminal strip 81. The relay's low voltage, low current actuation coil can be activated by the output from stepping driver chips that can be mounted on the circuit board 82 under the back panel cover 85 in FIG. 8, for example. Each module 83 may include decoder circuitry for connection to a serial data output from the irrigation control logic circuitry (microprocessor) housed in panel 1 (see FIG. 1) and connected to the back panel circuit board 82 by a ribbon cable or other connector, as is described above.

The circuit board 82 may be made of two separated boards to save circuit board material, but is shown here for simplicity, as a single board with separated connections 90 and 91 for the modules. The control connections 90 run along the top of the circuit board to allow for control of the modules 83. The output connections 91 run along the bottom of the board 82 next to the output terminal strip 81 for power input and output connection to the terminal strip 81.

One advantage of this embodiment is that it provides increased protection from lightning and increased surge protection of the low voltage control elements of the station modules 83 and the irrigation controller microprocessor in panel 1, for example. That is, since the modules 83 are physically separated from the terminals 84, there is less likelihood that they will be damaged in the event of a lightning strike.

The expansion modules 83 shown in FIG. 8 are shown as controlling two station terminals 84 each, but could be manufactured for controlling four, six or eight station output terminals and lined-up with the station terminals appropriately. Alignment pins (not shown) may be provided to stand up off the back wall of the housing 80 in a manner similar to that of the pins 60 of FIG. 2, for example. The modules 83 may be aligned and held in place by a twist lock screw 88 in hole 87 or a continuous channel slot in the back panel of the housing 80 and pushed against each other to stack side by side. Terminal 89 could, for example, be connected as a common ground return from all of the watering stations.

The microprocessor may determine which of the station modules 83 are installed by sensing which outputs of the main controller circuit draw current or feed back logic on a serial port trace connection between the control logic (microprocessor) in panel 1 and that contained in each of the modules 83. There are a number of ways to accomplish this that are well known in the art, and are not discussed in further detail herein. However, the simple concept of having the controller (microprocessor) make an inquiry whenever it is going to execute an irrigation program by a quick cycle through each station to sense which outputs of the main controller draw current is a simple and unique concept. That is, prior to implementing a watering program, the microprocessor may determine which connectors to the station modules are drawing current.

Figure 9:
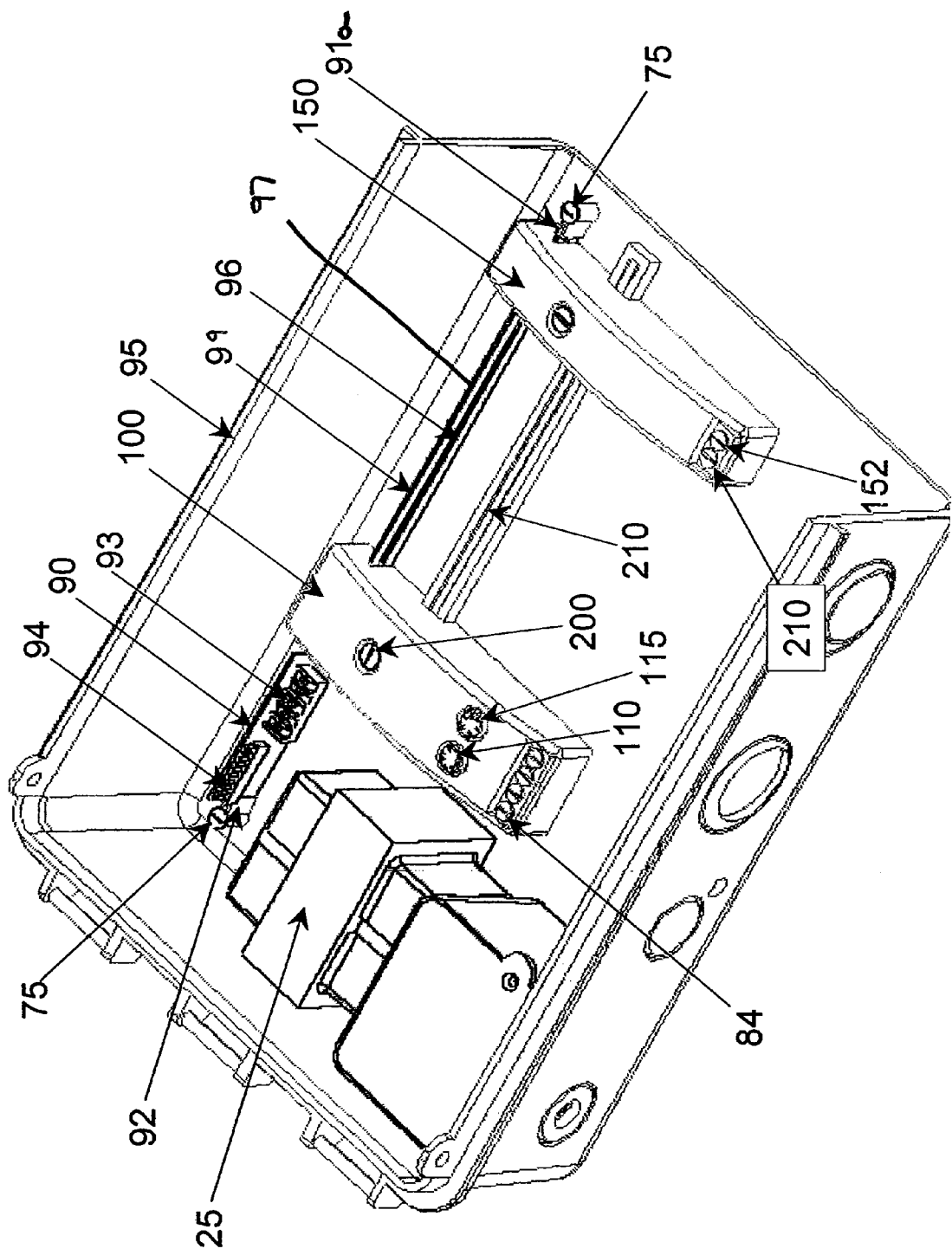
FIG. 9 is an illustration of an inner housing of an expandable irrigation controller in accordance with another embodiment of the present invention.

Another embodiment of a housing 95 for an expandable irrigation controller in accordance with an embodiment of the present invention is described with reference to FIG. 9. In FIG. 9, the power and distribution circuit board 99 is shown installed as standing in slots 91*a* and 92 that extend out of the back of the housing 95. Circuit board 99 has a right angle terminal block 93 wave soldered onto it for connections such as the terminals similar to the terminals 28, 29, 50, 53 and 51 of FIG. 2, previously described. A ribbon cable connector 94 can be wave soldered onto the circuit board 99 for connection to the control logic (microprocessor) housed in the removable panel 1 of FIG. 1.

The power and station expansion module circuit board 99 can be configured to only have two conducting traces 96 and 97 running across the irrigation controller housing 95 on the circuit board 99 that carry the 60 or 50 Hz, 24 volt power for actuating the irrigation system control valve solenoids. These two valve actuation power traces 96, 97 can also have high frequency serial control data optically, radio frequency or capacitively coupled onto them. Each module 100 preferably includes not only the switch circuitry for controlling the ON/OFF signal provided to the terminals, but also a decoder chip or circuit for decoding the high frequency serial data which tells each module 100 that it is plugged into the circuit board 99 and when to turn ON one of the watering stations it controls. Such "two wire" control electronic circuits are known in the electrical arts and are not described in further detail herein. However, it is believed that the use of such circuits has not previously been disclosed or suggest for use in irrigation controllers as described herein.

The modules 100 can be of any size and their output terminals may be positioned anywhere. The modules 100 may be positioned in the primary housing 95, or in another external housing (not shown) which is preferably configured in the same manner as housing 95. This additional housing is referred to as housing 95B for the sake of convenience.

The additional housing 95B may be powered and may include modules similar to the station modules 100 enclosed therein which are preferably connected to this power. Circuit board 99B of the housing 95B is preferably controlled by the microprocessor of the panel 1 connected to the housing 95.

The expander module 150 in FIG. 9 is shown connected to the circuit board 99 of the housing 95. The module 150 is preferably operable to provide two wire power and control signals via the two wire connection 210, 152 to the housing 95B, for example. In this configuration the housing 95B need not have a transformer power supply of its own.

Figure 9A:
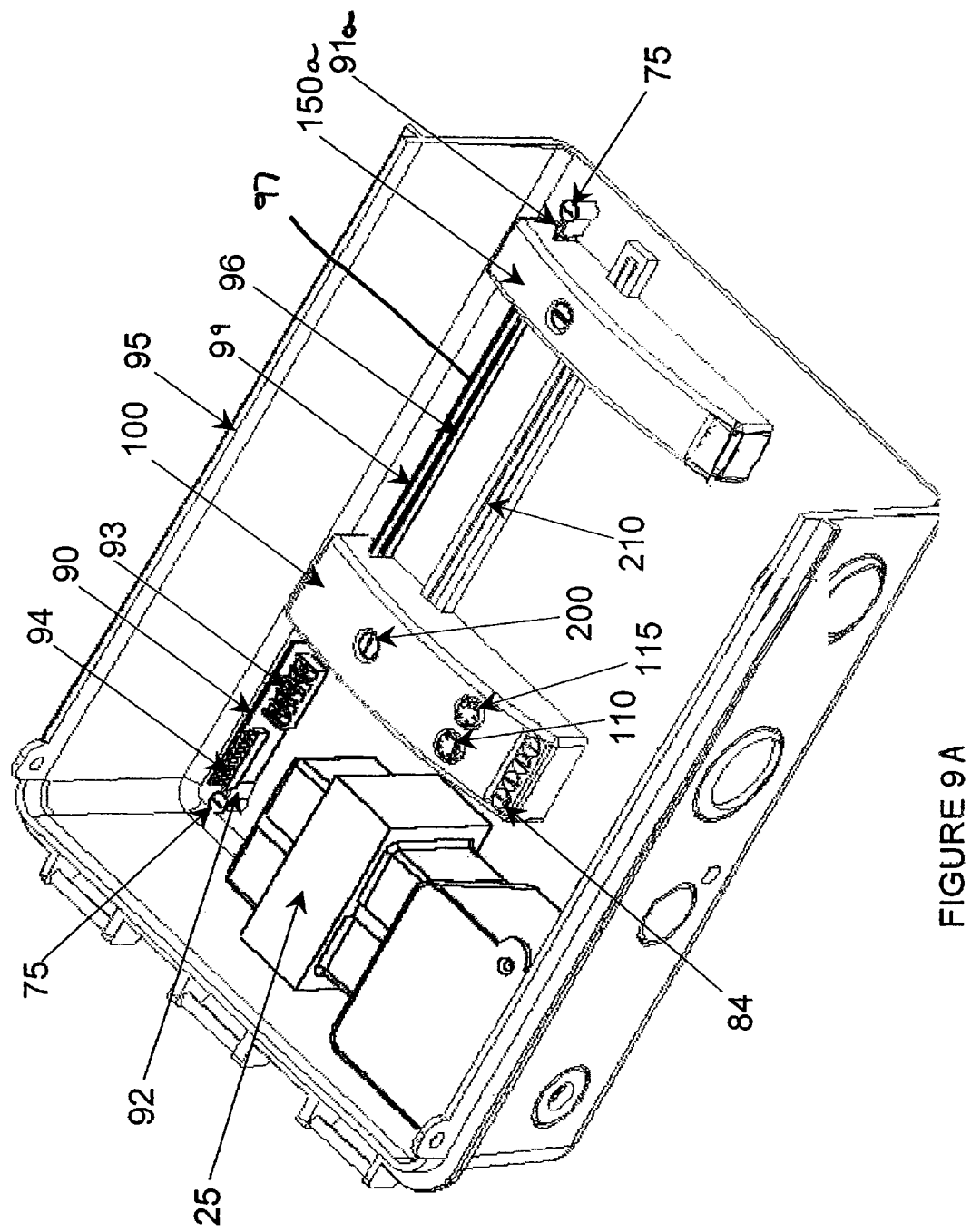
FIG. 9A is an illustration of an inner housing of an expandable irrigation controller in accordance with another embodiment of the present invention
Figure 10:
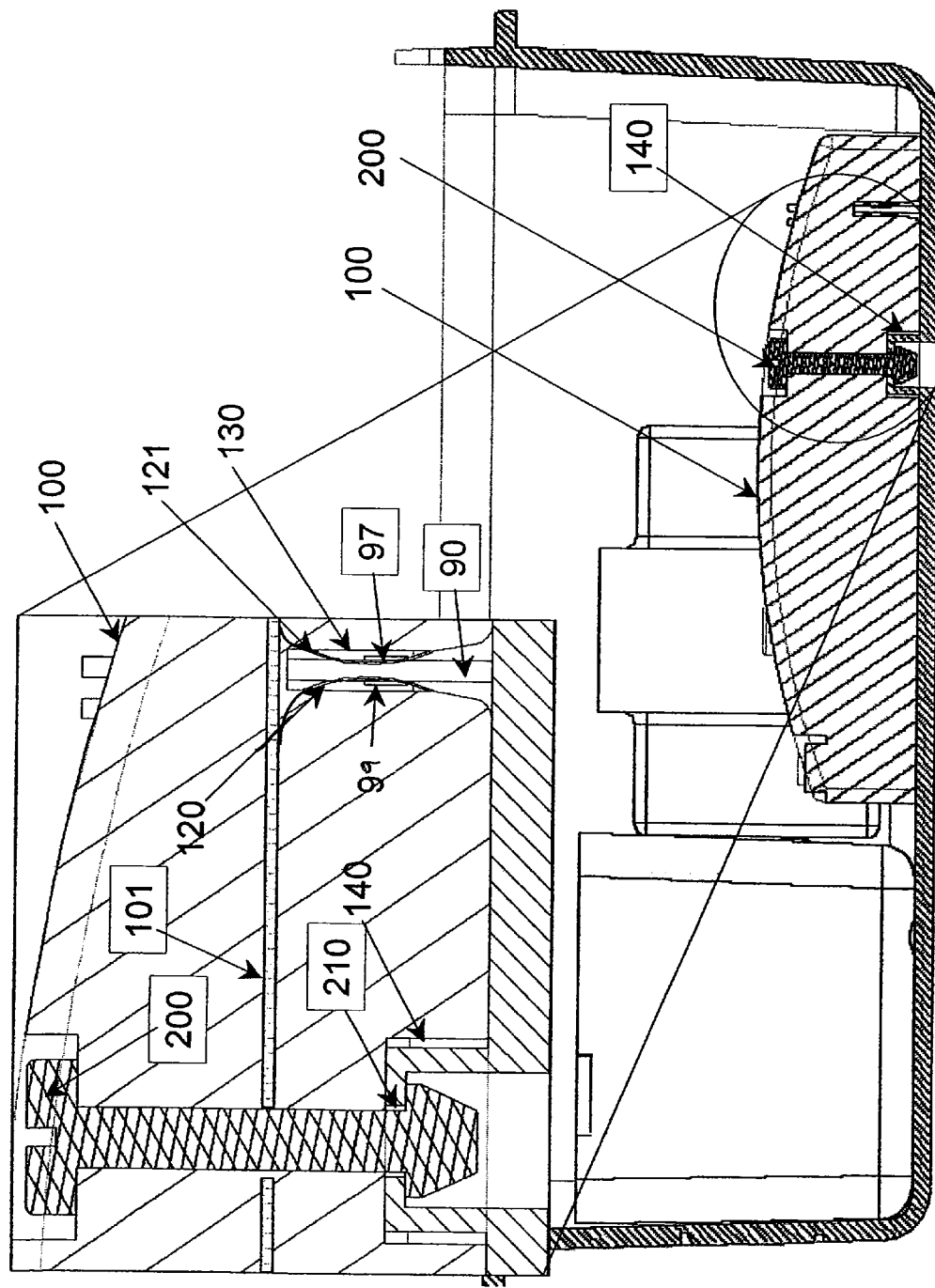
FIG. 10 shows a cross-sectional view of a station expansion module mounted in the inner housing of FIGS. 9 and/or 9A.

The connection to circuit board 99B need only be two conductors to provide power and control to the additional external modules in housing 95B (presuming a 24 volt solenoid actuation signal). If desired, additional external housings may be provided and interconnected in a similar manner. Alternately, the additional module housing 95B may be coupled to the housing 95 by a radio frequency module 150a, for example, as illustrated in FIG. 9A. The housing 95 of FIG. 9A is substantially similar to that of FIG. 9 except that the radio frequency module 150a replaces the expander module 150. This module 150a need not include any terminals since it is unnecessary to connect this module to any watering stations itself. However, this module is preferably connected to the two traces 96, 97 of the power and control circuit house 99 by being plugged into the circuit board 99, for example, as illustrated in FIG. 10. The additional irrigation housing 99B referred to above may be linked to the housing 99 by radio frequency, as noted above, provided that it includes its own power source, such as a transformer. Other external housings may be similarly linked to housing 99, if desired, as well. The radio frequency module 150a may be plugged into the circuit board 99 for electrical connection to the traces 96, 97 as illustrated in FIG. 10. Preferably, the radio frequency module 150a is a transmitter/receiver (transceiver) module and does not require any output terminals since it is not connected to a watering station. Power is provided by the traces 96, 97 which also provide a link to the traces 96, 97 such that control information received by module 150d, that may be provided from a radio frequency source, such as a separate hand held remote, for example, is provided to all modules connected to the traces 96, 97. The module 150a also transmits the control information to external housings such as housing 95B, for example, to provide control information to them as well. That is, a radio frequency source (not shown) may be provided to send control signals to the module 150a which may be linked to the traces 96, 97 such that the control signals may be sent to other modules in housing 95 and may be transmitted to external housings, such as housing 95B, for example, to control all of the modules. The radio frequency source may be an external or handheld device or may be installed in the panel 1, if desired. Control information may also be provided from the microprocessor in panel 1, for example, and transmitted to the external housing 95B if desired as well.

The two wire type station modules 100 mentioned above, preferably include decoder setting dials 110 and 115 to indicate which station they are turning on and which irrigation enclosure housing 95, 95B etc. they are in. For example, the dials may be used to indicate that the module is positioned in housing 95 rather than housing 95B. The second dial 115 can be eliminated if the number of stations to be controlled is small enough to be represented on a single selection dial 110. The configuration shown in FIG. 8, where the out terminal strip 81 is mounted in housing 80 can be applied to these two wire control modules 100, if desired.

A cross sectional view of a module 100 being plugged onto the circuit board 99 is shown in FIG. 10. The spring contacts 120 and 121 of the module 100 are shown pressing on conducting traces 96 and 97 of the circuit board 99. The module contacts are preferably in a slot 130 across the bottom of each module 100. There can be a second slot 140 across the bottom of each module 100 for alignment and to provide space for the retention screw 200 in retention slot 210 to secure the module to the housing 95.

Figure 11:
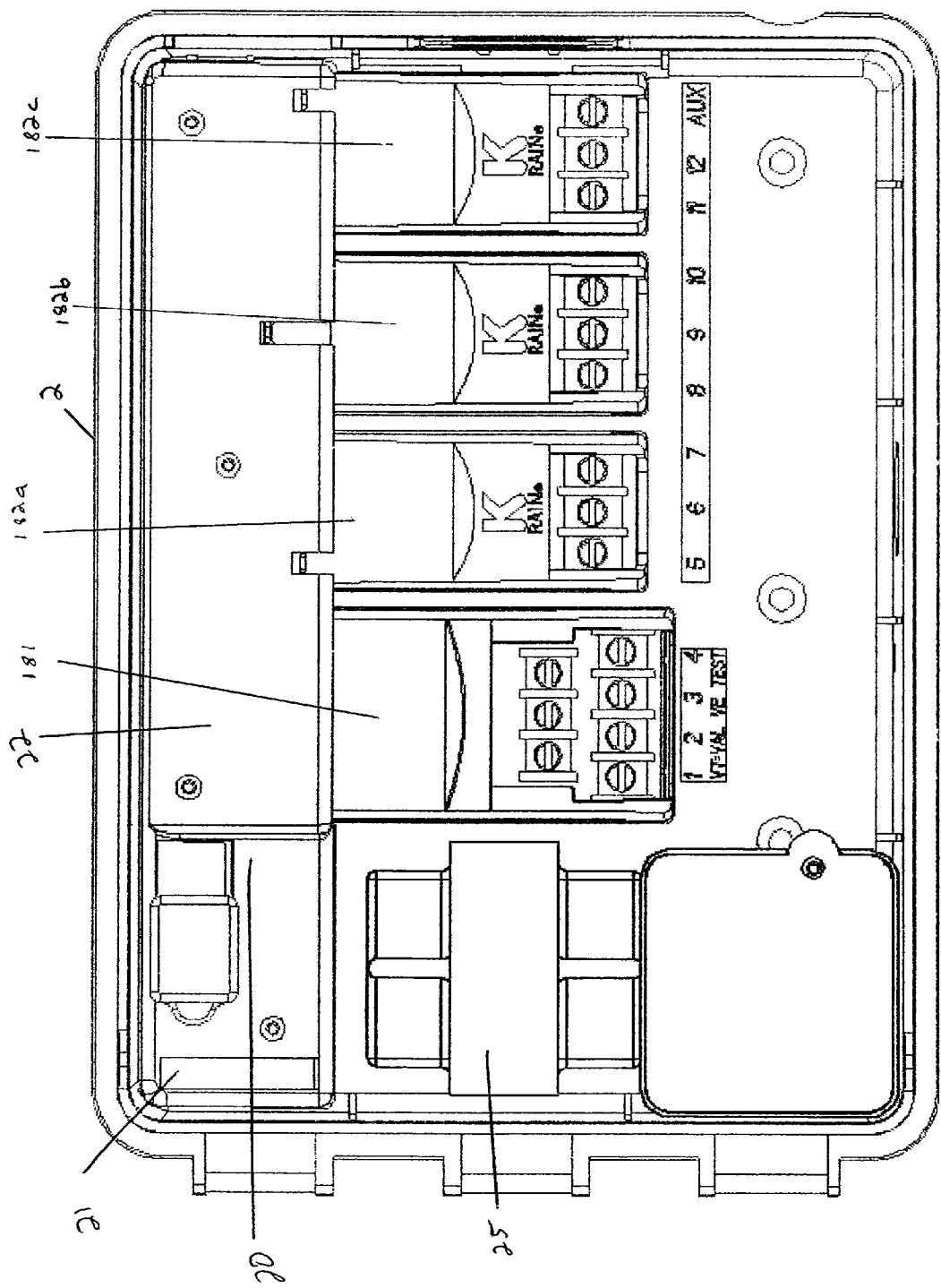
FIGS. 11-12 illustrate an inner housing of an expandable irrigation controller in accordance with another embodiment of the present application.
Figure 12:
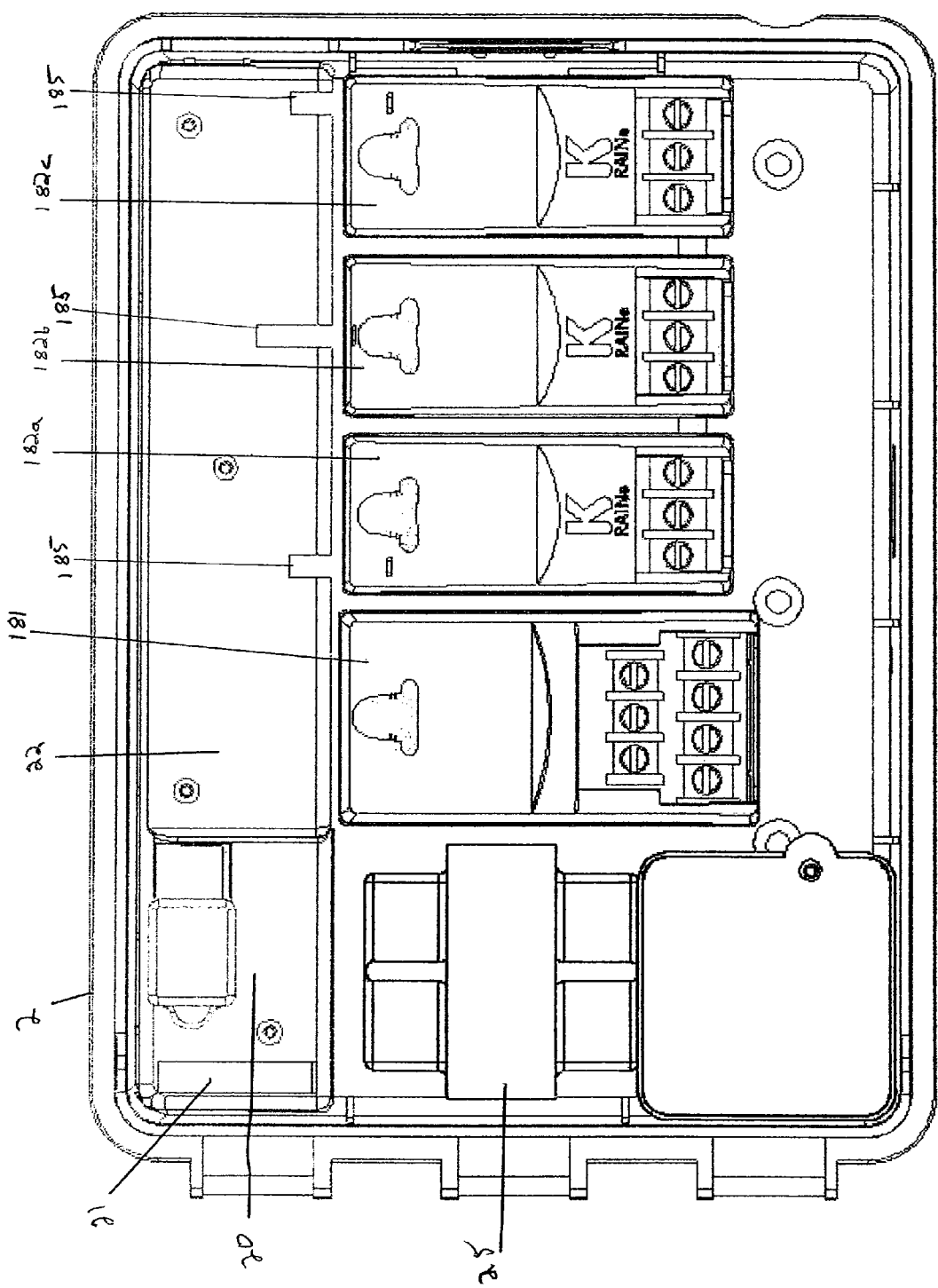

FIGS. 11-12 illustrate another embodiment of an inner housing of an expandable irrigation controller in accordance with an embodiment of the present application. The controller of FIGS. 11-12 is similar to that of FIG. 2, for example, and common reference numerals are used to refer to common components.

In FIG. 11, housing 2 includes 4 modules 181, 182a, 182b, 182c mounted therein. As illustrated, while the modules 182a, 182b, 182c include terminals for connection to the same number of watering stations, however, these modules are not interchangeable. The panel cover 20 of the housing 2 includes a plurality of slots 185. Each of the modules 182a, 182b, 182c includes a protrusion 184a, 184b, 184c, respectively, that fits into one of the slots 185 on the panel cover 20. As a result, the modules 182a, 182b, 182c are not interchangeable with one another. FIG. 12 illustrates the modules of FIG. 11 repositioned so that they are not mounted in order to illustrate how the slots 185 and the protrusions 184a, 184b and 184c are lined up prior to mounting.

Figure 13:
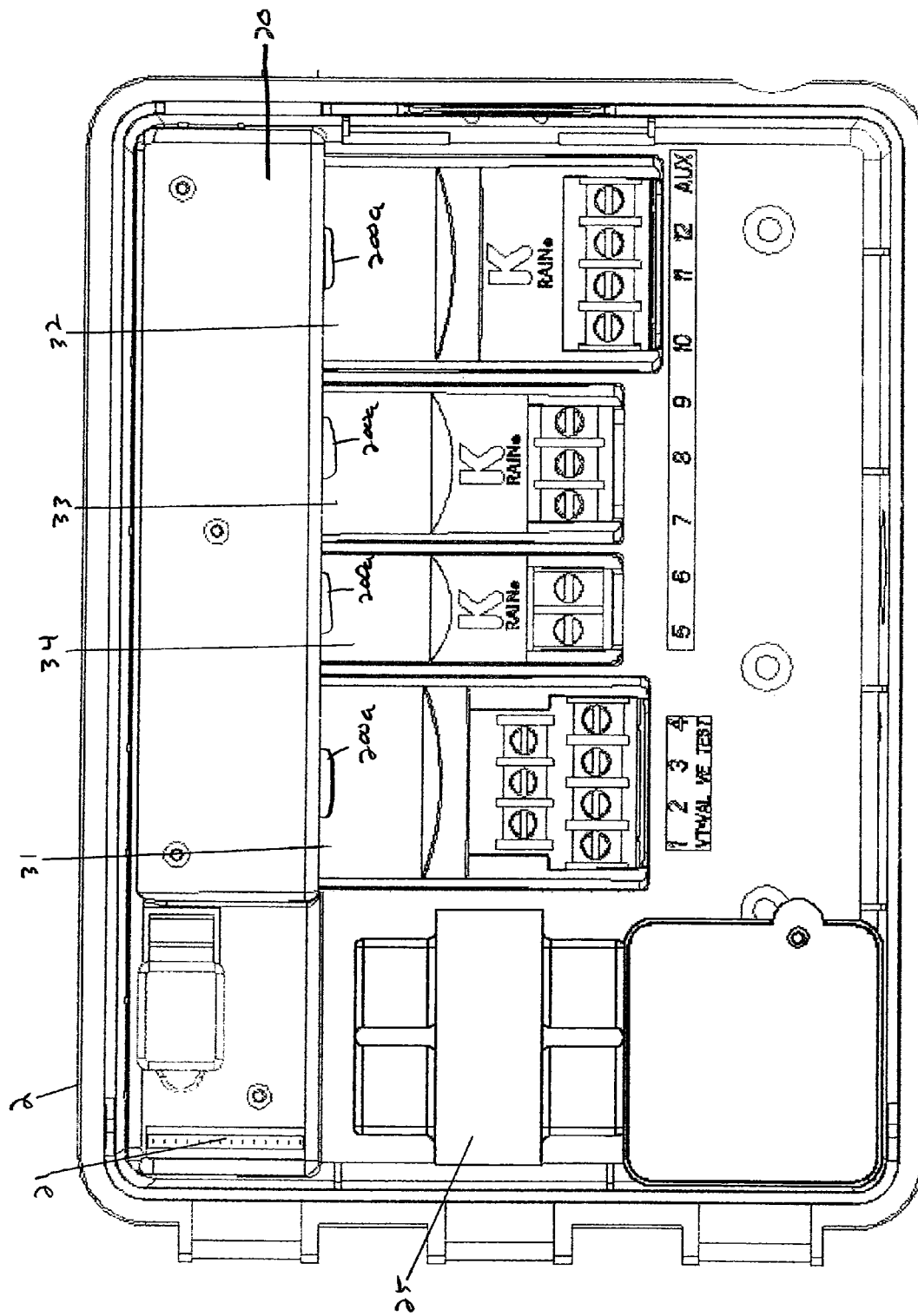
FIGS. 13-14 illustrate an inner housing of an expandable irrigation controller in accordance with another embodiment of the present application.
Figure 14:
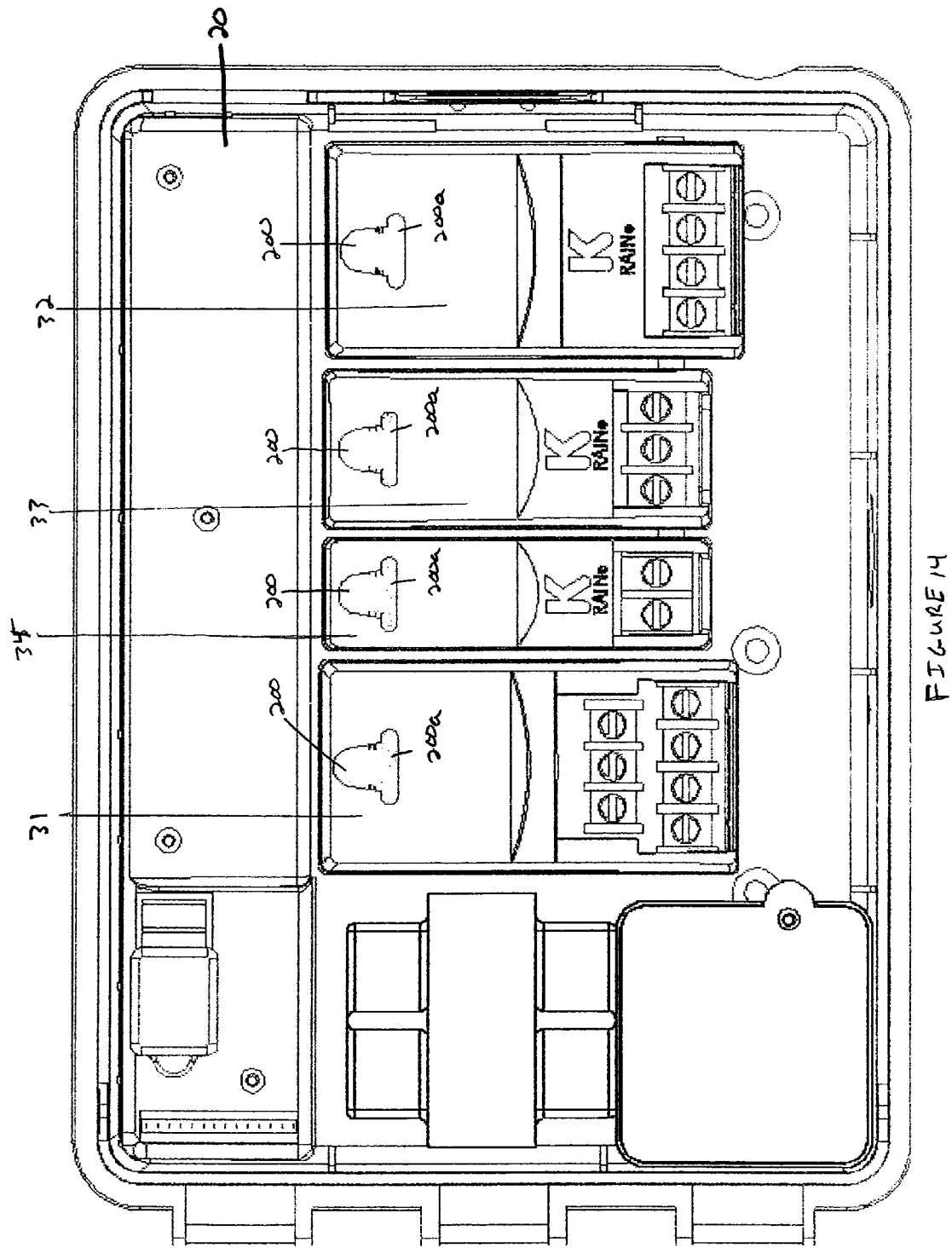

FIGS. 13-14 illustrate another embodiment of an expandable irrigation controller in accordance with an embodiment of the present application. The controller of FIGS. 13-14 is similar to that of FIGS. 1-3, for example, and common reference numerals are used to refer to common components. As is best illustrated in FIG. 14, the modules 31, 32, 33, 34 are mounted in the housing 2 and are secured in place by the resilient fastening tabs 200 positioned on the top surface of each of the modules. The tabs 200 preferably protrude upward slightly. However, when the modules are mounted in the housing 2, as illustrated in FIG. 13, the tabs 200 are depressed so that each module slides under the panel cover 20. The tabs 200 then protrude upward to engage a lip (not shown) on the bottom surface of the panel cover 20 to prevent removal of the modules from the housing 2. The tabs 200 include a portion 200a that extends slightly outward from the cover 20 when the module is mounted in the housing 2. This portion 200a can be depressed to allow for removal of the modules from the housing 2. It is noted that the modules 31, 32, 33, of FIGS. 11-12 may also include similar locking tabs if desired.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An expandable irrigation controller for controlling a plurality of watering stations in an irrigation system comprises:
    a removable front panel, the removable front panel comprising:

a plurality of manual controls operable to input instructions for a watering program;

a memory operable to store the input instructions; and a controller operable to execute the watering program; and an inner housing, connected to the front panel, the inner housing comprising:

a circuit board connected electrically to the controller, wherein the circuit board includes two electrical conductors extending across the inner housing, wherein control information from the controller is encoded for transmission on the two electrical conductors; and a station module operable to provide an ON/OFF signal to at least one watering station of the irrigation system, wherein the station module is electrically connected to the two electrical conductors and the ON/OFF signal is provided based on the control information from the controller in accordance with the watering program, and wherein the station module connects to the two electrical conductors at substantially any desired location along the conductors.

2. The expandable irrigation controller of claim 1, wherein the station module further comprises:

control contacts operable to electrically connect the station module to the two electrical conductors;

a decoder circuit operable to decode the control information from the controller sent to the station module by the two electrical conductors;

a switching circuit operable to provide the ON/OFF signal for the watering station based on the decoded information; and a terminal connected the watering station to send the ON/OFF signal to the watering station.

3. The expandable irrigation controller of claim 2, further comprising:

an expander module mounted in the inner housing and connected to the two electrical conductors, wherein the expander module is operable to pass the control information from the two electrical conductors to an external housing in which one or more external station modules are mounted, such that the control information from the controller is used to control the external station modules.

4. The expandable irrigation controller of claim 3, wherein the station module further comprises a setting dial rotatable between a plurality of positions, wherein a specific position of the setting dial indicates the watering station controlled by the station module and whether the station module is positioned in the external housing.

5. The expandable irrigation controller of claim 2, further comprising:

a radio frequency module connected to the two electrical conductors and operable to send and receive radio frequency signals, wherein the radio frequency module sends a control radio frequency signal to an external housing in which one or more external station modules are mounted, such that the control information in the control radio frequency signal is used to control the external station modules.

6. The expandable irrigation controller of claim 5, wherein the control information is received from the controller via the two electrical conductors.

7. The expandable irrigation controller of claim 5, wherein the control information is received from a remote radio frequency source; and wherein the radio frequency module links the control information to the two electrical conductors such that the control information is provided to the station module in the inner housing and is included in the control radio frequency signal.

8. The expandable irrigation controller of claim 7, wherein the housing further comprises a second station module connected to the two electrical conductors, wherein the second station module is operable to control a watering station based on the control information linked to the two electrical conductors by the radio frequency module.

* * * * *